July 29, 1969

S. EDISON 3,457,585

RESTRAINING APPARATUS FOR THE SLAUGHTERING
OR TREATING OF ANIMALS

Filed Aug. 19, 1966

Samuel Edison
INVENTOR.

BY Clarence A. O'Brien
and Harvey B. Jacobson
Attorneys

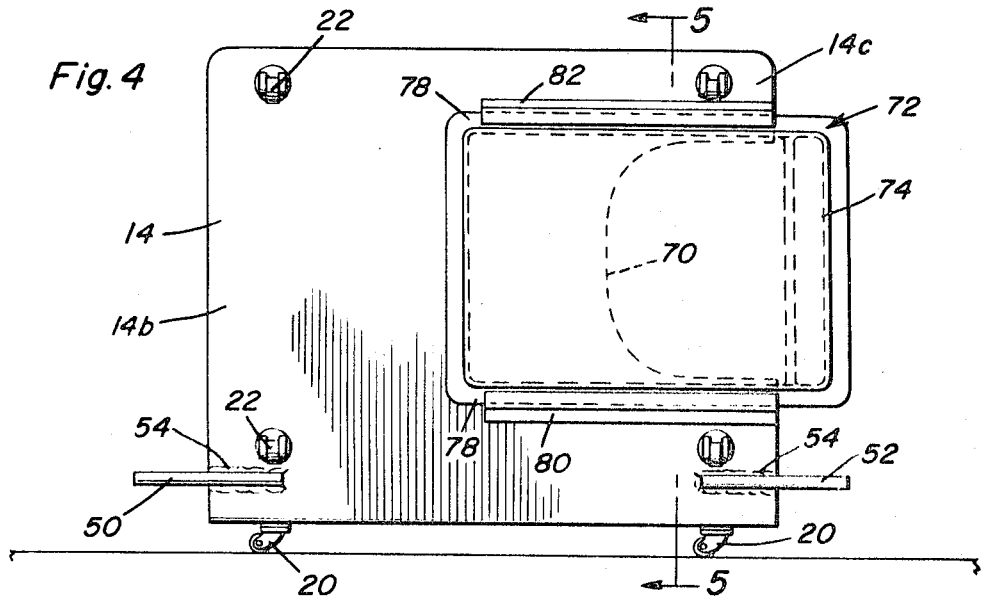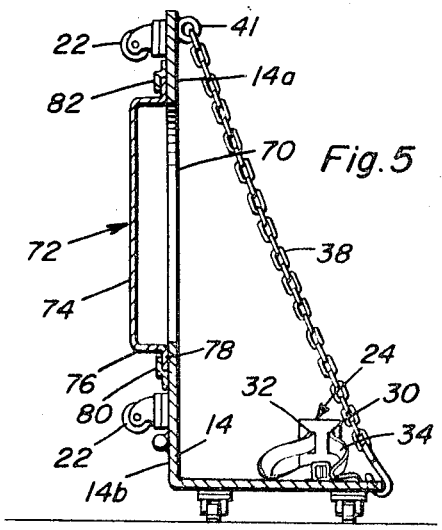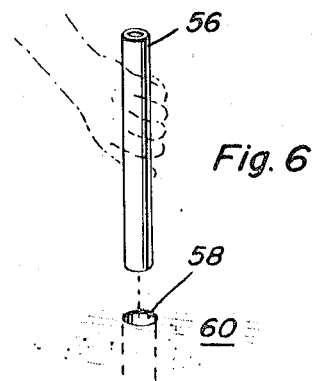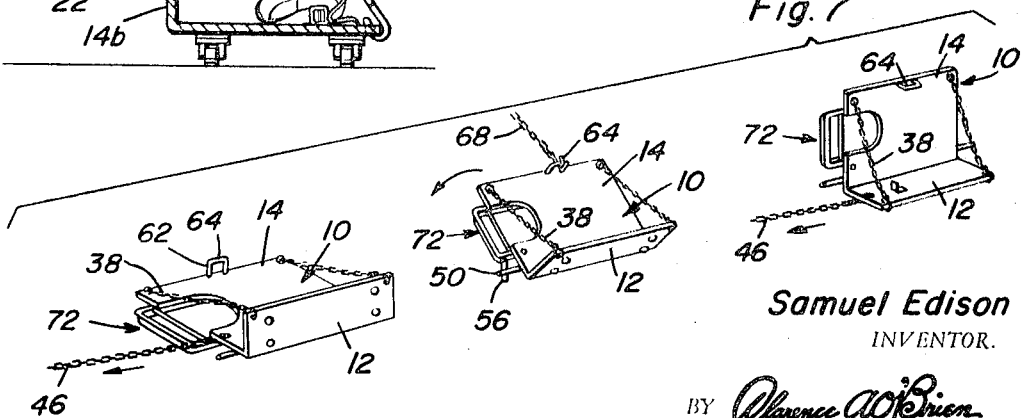

United States Patent Office 3,457,585
Patented July 29, 1969

3,457,585
RESTRAINING APPARATUS FOR THE SLAUGH-
TERING OR TREATING OF ANIMALS
Samuel Edison, 2700 Idlewood Ave., Apt. 13,
Richmond, Va. 23220
Filed Aug. 19, 1966, Ser. No. 573,584
Int. Cl. A22b 3/00, 5/04, 5/06
U.S. Cl. 17—1                    1 Claim

ABSTRACT OF THE DISCLOSURE

A carriage device for transporting a vertically oriented and restrained animal along a supporting surface. Means are provided for pivoting the carriage to a rearwardly inclined position during animal slaughter. The carriage is subsequently pivoted to a horizontal position. A removable blood collecting tray is disposed in underlaying relation with the slaughtered animal's severed neck to collect blood flow therefrom. Casters are provided on the carriage to permit motion thereof while the animal is retained in both the vertical and horizontal positions.

---

This invention generally appertains to improvements in restraining devices or the like for retaining animals in position for treating the animals, and more especially, relates to novel improvements in a method of and mobile apparatus or carriage for use in the treating or slaughtering of an animal.

The provision of animal treating tables which are adapted to receive and retain an animal in a standing erect position and to have the animal secured thereto and then to be titltable or movable so as to position the animal into a horizontal, side lying position are well known. However, apart from the extremely nad unduly complicated structural details of such devices, both with respect to the animal restraining means and with respect to the means for moving the animal, in a restrained position, from a standing erect position into a horizontal, laid down position, such known devices are located in one place and all of the operations are carried out at such location.

Accordingly, an important object of the present invention is to provide a method of slaughtering an ainmal which includes positioning the animal on a mobile carriage in a standing erect position and securing the animal thereto in a restrained manner and then moving the carriage, with the animal so positioned thereon, to a slaughtering location and tilting the carriage so that the animal is disposed in a horizontal, side lying position and, while the animal is so positioned and restrained, severing the throat of the animal and then moving the carriage, with the animal still in such position to a removal location, with the blood outflow from the slaughtering cut being collected in a collection means on the carriage so as to not drip or spill over onto the supporting floor surface.

Another important object of the present invention is to provide a mobile carriage for the transportation of an animal for treating or slaughtering the animal, the carriage being so formed that the animal is positioned thereon in a standing erect position and secured thereto and the carriage being movable with the animal in such standing erect position and then the carriage being tiltable so as to support the animal in a laid down, side horizontal position and being movable with the animal in such latter position.

Another object of the present invention, particularly in connection with the slaughtering of the animal, is to provide means in association with the carriage, when the animal is in a laid down, horizontal position for slaughtering, such means being adapted ot collect the outflow of blood from the slaughtering cut made in the animal's throat and to prevent the blood from dripping onto the carriage proper or onto the floor or supporting surface on which the carriage is moved.

More particularly, another object of the present invention is to provide a right angularly walled carriage, which includes first and second right angularly related walls, the walls having outer faces provided with mobile means, so that the carriage can move, when either of the walls is in a horizontal position and has its mobile means in ground engagement.

A further object of the present invention is to provide a generally L-shaped carriage, which includes a generally horizontally disposed first wall and a generally vertically disposed second wall, means being provided on the exterior surfaces of both of the walls for enabling the walls to move on a supporting surface and means being provided for retaining the animal in a secure and restrained manner on the carriage, with the animal initially standing in an erect secured position on the inner surface of the first wall and the carriage then being moved to a particular treating location, such as a slaughtering station, and means being provided whereby the carriage can be tilted so that the normally vertically disposed second wall is brought into a horizontal position and the animal rests thereon in a hornzontal laid down position.

Commensurate with the foregoing, another object of the invention is to provide a receptacle means, which is removably disposed in the second wall, and which is adapted to underlie a particular portion of the anatomy of the animal for the collection of blood. For example, the receptacle means is adapted to underlie the head and neck of the animal in the instance of the animal being butchered or slaughtered by severing the throat of the animal.

A still further important object of the present invention is to provide means whereby the carriage can be easily and simply tilted so that the animal is moved from a standing erect position on the movable carriage, during its path of travel, into a horizontal, laid down position.

A further important object of the present invention is to provide a novel and inexpensive method for the speedy and efficient slaughtering of animals in a more rapid, production line manner and to provide a compact, sturdy, inexpensive and efficient mobile carriage or carrier for transporting an animal, in a secured manner, and for bodily moving the animal, during the transporting thereof, from a standing erect position into a horizontal, side-lying position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an elevational view of the normally vertically disposed wall of the carriage;

FIGURE 5 is a transverse sectional view, taken on line 5—5 of FIGURE 4, and illustrating in greater detail the receptacle means associated with the one wall and the leg restraining means carried by the other wall and the means between the walls for preventing an animal from sagging and moving;

FIGURE 6 is a perspective view of the means, which is removably secured to the floor supporting surface and which cooperates with means on the carriage for effecting the tilting action; and FIGURE 7 is a diagrammatic illustration of the positions taken by the carriage during the carrying out of the slaughtering of an animal.

Figure 1:
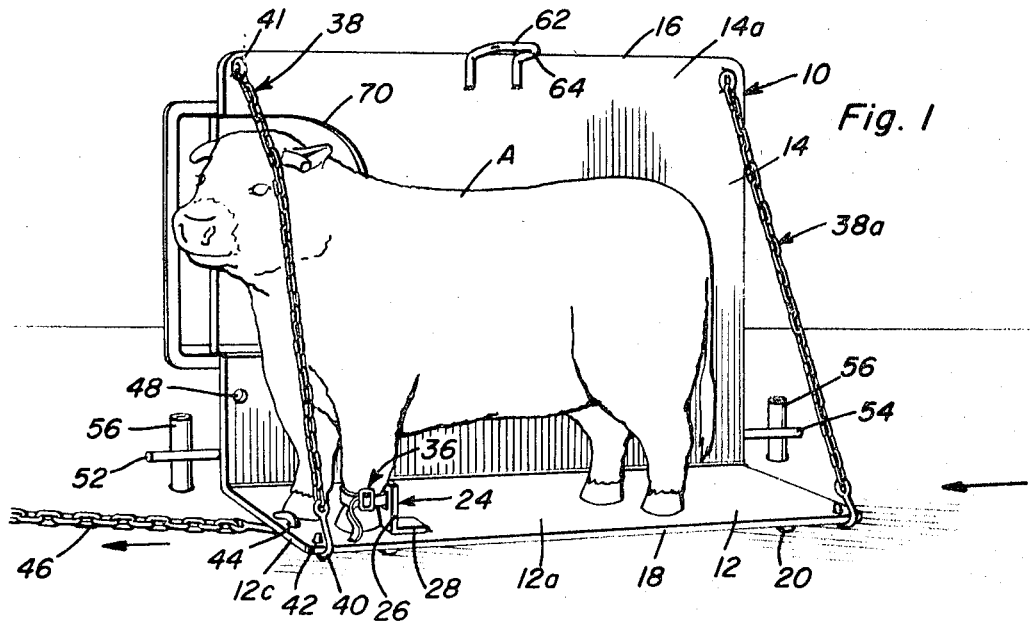
FIGURE 1 is a view in perspective of a carriage or apparatus, constructed in accordance with the principles of the present invention.

Referring now more particularly to the drawings, the carriage 10 is a rigid substantially right angular wall structure and is composed of a first substantially rectangular wall 12 and a second substantially rectangular wall 14, the walls having joined inner side edges, which are in integral association. Thus, the carriage is elongated and the walls 12 and 14 extend longitudinally and have longitudinal adjoining inner side edges, which are secured together, or, in the shown instance, the carriage is composed of a rigid L-shaped one piece plate.

In any event, the wall 12 is normally horizontally disposed, while the second wall 14 is normally vertically disposed and it will be noted that the wall 14 is of a considerable greater dimension from its side edge connected to the wall 12 and its outer free side edge 16 than the wall 12 is from its attached inner side edge to its outer side edge 18.

Figure 2:
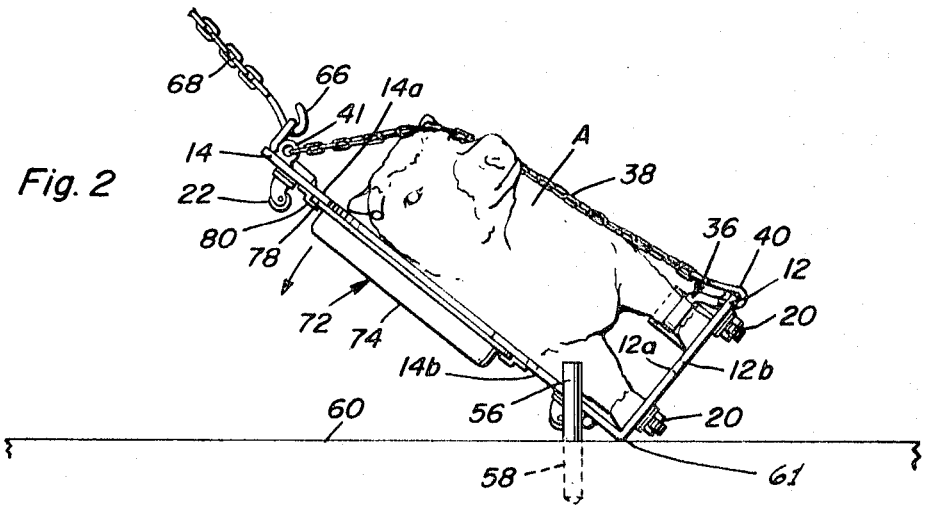
FIGURE 2 is an end elevational view, showing the carriage in a tilting position.

From a standpoint of FIGURE 1, it may be said that the walls 12 and 14 are coextensive in length but that the wall 14 is of a much greater height than the width of the wall 12. This may be explained by virtue of the fact, as shown in FIGURE 2, the animal A is adapted to stand in an erect position on the inner surface 12a of the wall 12 while the body of the animal is adapted to lay in a sidewise manner on the inner surface 14a of the wall 14, when the carriage is tilted about a horizontal axis so as to dispose the normally vertical wall 14 in a horizontal position and the normally horizontal wall 12 in a vertical position, as shown in FIGURE 3.

The wall 12 is provided with an outer face or side 12b and is provided on its outer face 12b with freely swiveling caster wheel assemblies 20, which constitute the means whereby the carriage may be moved, when the wall 12 is horizontally disposed and the animal is positioned on the carriage in a standing erect manner, as shown in FIGURE 1.

The wall 14 has an outer side or surface 14b, which is provided with caster wheel assemblies 22, so that the carriage may be moved, when the wall 14 is in a horizontal position.

Figure 3:
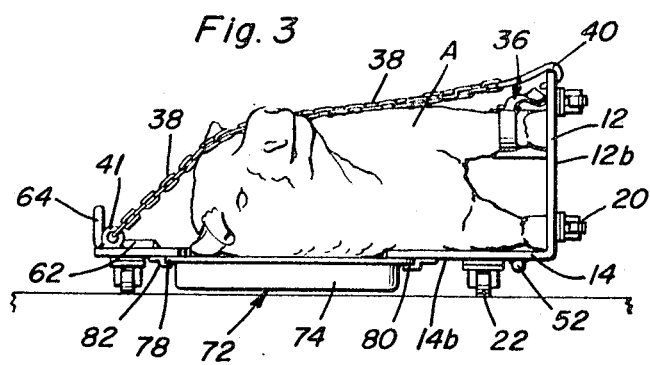
FIGURE 3 is an end elevational view showing the carriage in its position for transporting the animal in a horizontal, side-lying position.

Accordingly, it can be appreciated from a consideration of FIGURES 1 and 3 that, irrespective of whether the animal is in an erect standing position on the wall 12 or in a sidewise horizontal laid down position on the wall 14, the carrage may be moved by virtue of the fact that both of the walls have outer surfaces which are provided or equipped with caster wheel assemblies 20 and 22, or their structural and functional equivalents, rendering the carriage mobile in either of its two positions of travel, as shown in FIGURES 1 and 3.

Means is provided for securing the animal A on the carriage and such securing means comprises a leg encircling means 24, as shown more particularly in FIGURES 1 and 5. The leg encircling means comprises a rigid brace member or plate 26, which upstands from the face 12a of the plate 12 or, more particularly, is disposed perpendicular and normal thereto and which is affixed thereto by virtue of a lateral mounting flange 28 which is suitably fixedly superimposed on the face 12a. The plate and flange 26 and 28 may be in the form of a rigid angle iron.

The plate 26 is formed with a pair of spaced apart slots 30 and 32 for the slidable reception of a strap 34, which is provided with conventional buckling means 36, the strap being adapted to encircle and securely engage the leg of the animal A, as shown in FIGURES 1 and 3. Obviously, in place of the strap, any other flexible restraining means may be employed in conjunction with supporting means fixedly carried by or secured to the face 12a of the plate 12. The leg encircling means is preferably disposed adjacent the front end portion 12c of the plate so that it engages one of the front legs, preferably the outer leg of the standing animal.

In addition to the leg engaging and restraining means, the securing means may include a flexible element, such as the chain 38, which has a hook end 40 that is adapted to engage in an aperture 42 formed in the plate 12, adjacent the juncture of the front and outer side edge portions 12c and 18 of the plate so as to retain the head of the animal, as shown in FIGURES 1-3. The opposite end of the flexible element is suitably attached to an apertured ear 41, which outstands laterally from the inner side or face 14a of the plate 14. Also, depending upon the length of the animal, in association with the length of the carriage as defined by the length of the two plates or walls 12 and 14, the rear end portion of the carriage may be provided with a similar flexible retaining means 38a, as shown in FIGURE 1.

The carriage is adapted to be pulled forwardly by any suitable means and, for this purpose, an opening 44 is formed in the wall 12, adjacent the front edge 12c so as to receive a flexible hauling or tow line 46, as shown in FIGURE 1. For the same reason, when the wall 14 is horizontally disposed, as shown in FIGURE 3, the tow or haul line 46 may be attached thereto by virtue of an opening or aperture 48 formed in the wall, as shown in FIGURE 1.

The animal A is positioned in a standing and erect position on the inner side or face 12a of the wall or plate 12 and one of the front legs, preferably the outer front leg, is securely fastened to the wall or plate 12 by means of the securing means 24 and the flexible members 38 and 38a may be utilized to prevent the animal from sagging and moving.

Means is provided for tilting the carriage from the position, as shown in FIGURE 1, to the position, as shown in FIGURE 3, through the intermediary position, as shown in FIGURE 2. Such means includes the provision of rods or pins 50 and 52 which, as shown in FIGURE 4, are secured, as by welding, soldering or the like 54, to the outer side or face 14b of the wall 14. The rods have end portions which project beyond the end edges of the wall 14 and the rods are disposed in coplanar relationship and extend forwardly and rearwardly from the wall and beyond the ends of the carriage, as shown in FIGURE 1.

When it is desired to tilt the carriage, the carriage is moved into position, as shown in FIGURE 1, so that the projecting end portions of the rods 50 and 52 are in cooperting relation with upstanding projections or abutment members 56. Such members 56, as shown more particularly in FIGURE 6, are in the nature of tubular components or rods, which are adapted to be removably socketed in sockets or seats 58 formed in the surface 60, which may be the floor surface of a slaughtering house. The rods 56 are removably socketed in the sockets 58 and are spaced apart a distance equal to the spaced apart extent of the projecting end portions of the rods 50 and 52 so that the projecting end portions can lie alongside such upstanding projections 56, which function as fulcrums about which the projecting ends of the rods can move. It will be appreciated by viewing FIGURE 2, that the edge of intersection 61, between walls 12 and 14, exhibits relative contacting motion with respect to the floor 60 during the tilting of the carriage.

As shown in FIGURE 2, the uppermost portion of the inner face 14a of the wall 14 is formed with a clip 62, which has a U-shaped outstanding portion 64 that is adapted to be gripped by a hook 66 of a hoisting or pulling chain or similar flexible element 68, by means of which it is possible to apply the necessary force to cause the carriage to tilt about the upstanding projections 56, with the horizontal projecting ends of the rods 50 and 52 sliding and rolling about such projections, as fulcrum point, until the hoisting line 68 lowers the carriage into the position, as shown in FIGURE 3, wherein the wheel elements or caster wheel components 22 are in ground engagement and support the carriage for movement, with the animal in a laid down or horizontal position.

In connection with the slaughtering of the animal A, which is effected by severing the throat of the animal, means is provided for collecting or catching the outflow of blood so that there is no spillage of blood onto the supporting floor surface 60. In this respect, the forward end portion 14b of the wall 14 is formed with a U-shaped cutout portion 70, such U-shaped or arcuate cutout portion 70 being of a dimension and being so disposed that the head and neck portion of an animal will overlie the same, when the wall 14 is in a horizontal position, as shown in FIGURE 3. A receptacle or container 72 is provided for closing off the opening 70, as shown in FIGURES 3 and 4. The receptacle 72 includes a substantially rectangular, dish-shaped body portion 74, the side walls 76 of which are formed with an externally extending, lateral flange 78. The opposing sides of the flanges 78 are adapted to be slidably received in rails 80 and 82 formed in spaced, parallel fashion on the outer side or face 14b of the wall 14 so as to slidably receive the receptacle. The receptacle is fixedly held within the rails 80 and 82, which are fixed on the side 14b of the wall 14. The receptacle, as shown in FIGURE 4, is adapted to extend beyond the edge of the forward end portion 14c of the wall 14 and is of a depth to lie below the side or face 14b of the wall but is shallow enough so that the underside of the bottom thereof is disposed above the surface 60 when the wall 14 is in a horizontal position and supported by the ground engaging wheel asemblies 22, as shown in FIGURE 3.

As shown diagrammatically in FIGURE 7, the initial step in the method of slaughtering an animal comprises the securing of an animal in an upright standing position, as shown in FIGURE 1, on the wall 12 which is in a horizontal position, right angularly related to the perpendicular or vertical wall 14. The animal is secured in place by means of the leg encircling means 36 and, if necessary, the flexible head and body engaging means, including the flexible holding elements 38 and 38a so as to prevent the animal from sagging and moving.

The carriage 10 is then moved forwardly by the tow or haul line 46 until the tilting station is reached, which is adjacent to or at the slaughtering location. As shown in FIGURE 7, the tilting is effected immediately prior to the slaughtering. At the tilting station, the carriage is tilted by means of the hoist chain 68 and the cooperating upstanding fulcrum projections 58 and pins or projections 50 and 52 so as to dispose the wall 14 in a horizontal position and the wall 12 in a vertical plane, with the animal lying sidewise on the wall 14. The pull or tow line 46 is then attached to the wall 14 and the carriage moves on the wheel assemblies 22.

The animal is slaughtered by severing the neck of the animal and the outflowing blood is collected in the receptacle 72 so that there is no spillage of blood onto the supporting floor surface 60. The carriage is then moved to a location where the animal is removed from the carriage for further butchering and the receptacle 72 is removed from the wall 14 for disposal of the blood in a sanitary manner.

The foregoing is considered as illustrative only of the principles of the invention. Further, since numeral modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A carriage for the transportation of an animal for heating or slaughtering or the like comprising a substantially right angular wall structure composed of a normally horizontal first wall and a normally vertical second wall, means for securing an animal in a standing upright position on the first wall, mobile means carried by said first wall for the movement of the carriage along a supporting surface with the animal in a standing secured position on the first wall, said carriage being tiltable to position the second wall in a horizontal position with the animal laid on its side thereon in a secure manner, and mobile means carried by the second wall for the movement of the carriage along a supporting surface with the animal in a laid down position on the second wall, and means for tilting said carriage so as to move said first wall into a vertical position and said second wall into a horizontal position, said tilting means including said second wall having ends, projections carried by the second wall and extending beyond the ends and upstanding elements adapted to be removably fixed to a supporting surface and constituting fulcrums which the projections are adapted to engage and about which the projections are adapted to swing and attachment means carried by the second wall for permitting forcible movement of the carriage about such fulcrum elements.

References Cited

UNITED STATES PATENTS

| | | |
|---|---|---|
| 211,741 | 1/1879 | Johnson. |
| 2,967,510 | 1/1961 | Stoody _____ 119—103 |
| 3,249,070 | 5/1966 | Day et al. |

FOREIGN PATENTS

| | | |
|---|---|---|
| 224,225 | 2/1958 | Australia. |
| 328,116 | 4/1930 | Great Britain. |
| 784,278 | 10/1957 | Great Britain. |

LUCIE H. LAUDENSLAGER, Primary Examiner

U.S. Cl. X.R.

119—103; 128—292